United States Patent
Imanishi et al.

(10) Patent No.: US 9,831,953 B2
(45) Date of Patent: Nov. 28, 2017

(54) EXCITATION LIGHT SOURCE DEVICE AND OPTICAL TRANSMISSION SYSTEM

(71) Applicant: MITSUBISHI ELECTRIC CORPORATION, Chiyoda-ku (JP)

(72) Inventors: Katsunori Imanishi, Chiyoda-ku (JP); Toshiyuki Tokura, Chiyoda-ku (JP); Hideki Sueoka, Chiyoda-ku (JP); Kengo Takata, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/026,466

(22) PCT Filed: Jan. 16, 2014

(86) PCT No.: PCT/JP2014/050697
§ 371 (c)(1),
(2) Date: Mar. 31, 2016

(87) PCT Pub. No.: WO2015/107658
PCT Pub. Date: Jul. 23, 2015

(65) Prior Publication Data
US 2016/0218809 A1 Jul. 28, 2016

(51) Int. Cl.
*H04B 10/08* (2006.01)
*H04B 17/00* (2015.01)
(Continued)

(52) U.S. Cl.
CPC ......... *H04B 10/2916* (2013.01); *H04B 10/07* (2013.01); *H04B 10/071* (2013.01);
(Continued)

(58) Field of Classification Search
CPC .............. H04B 10/2916; H04B 10/071; H04B 10/0775; H04B 10/0791; G02B 6/264
(Continued)

(56) References Cited

U.S. PATENT DOCUMENTS 6,738,132 B2 * 5/2004 Sobe .................. G01M 11/3145
356/73.1
6,807,001 B1   10/2004 Ranka et al.
(Continued)

FOREIGN PATENT DOCUMENTS

EP    1 522 840 A1    4/2005
JP    2002-221743 A   8/2002
(Continued)

OTHER PUBLICATIONS

International Search Report dated Apr. 22. 2014, in PCT/JP2014/050697 Filed Jan. 16, 2014.
(Continued)

*Primary Examiner* — Ken N Vanderpuye
*Assistant Examiner* — Abbas H Alagheband
(74) *Attorney, Agent, or Firm* — Oblon, McClelland, Maier & Neustadt, L.L.P.

(57) ABSTRACT

An excitation light source device includes: an excitation light source to generate the Raman excitation light; a light source controller to control an intensity of the Raman excitation light; an amplified spontaneous emission noise measurer to measure an intensity of amplified spontaneous emission noise caused by the Raman excitation light; and a transmission line abnormality analyzer to detect abnormality in the transmission line on a basis of a control state of the light source controller and a measurement result of the amplified spontaneous emission noise measurer. In a state where the abnormality is not detected, the light source controller controls the intensity of the Raman excitation light to gradually increase to a set value. In a state where the abnormality is detected, the light source controller controls the excitation light source to stop or reduce generation of the Raman excitation light.

9 Claims, 8 Drawing Sheets

(51) Int. Cl.
*H01S 3/00* (2006.01)
*H04B 10/291* (2013.01)
*H04B 10/07* (2013.01)
*H04B 10/071* (2013.01)
*H04B 10/077* (2013.01)
*G02B 6/26* (2006.01)
*H04B 10/079* (2013.01)

(52) U.S. Cl.
CPC ......... *H04B 10/0775* (2013.01); *G02B 6/264* (2013.01); *H04B 10/0791* (2013.01)

(58) Field of Classification Search
USPC .......................... 398/16, 33, 17, 37; 359/334
See application file for complete search history.

(56) References Cited

U.S. PATENT DOCUMENTS

| | | | | |
|---|---|---|---|---|
| 6,847,478 B1* | 1/2005 | Tanaka | ................ | H01S 3/2375 359/334 |
| 6,891,659 B2* | 5/2005 | Kikuchi | ............ | H04B 10/2916 359/334 |
| 6,934,016 B2* | 8/2005 | Sobe | ................ | G01M 11/3145 356/73.1 |
| 6,934,479 B2* | 8/2005 | Sakamoto | ......... | H04B 10/0775 398/193 |
| 7,068,421 B2* | 6/2006 | Tokura | ............... | H04B 10/2916 359/334 |
| 7,505,197 B2* | 3/2009 | Sugaya | ................ | G02B 6/264 359/334 |
| 7,916,384 B2* | 3/2011 | Zhou | ................ | H04B 10/2916 359/334 |
| 8,520,196 B2* | 8/2013 | Hirai | ................... | H04B 10/071 356/73.1 |
| 8,576,481 B2* | 11/2013 | Zaacks | ................ | H01S 3/0014 359/341.32 |
| 2002/0048062 A1* | 4/2002 | Sakamoto | ......... | H04B 10/0775 398/30 |
| 2002/0181078 A1* | 12/2002 | Tanaka | ................ | H01S 3/302 359/334 |
| 2003/0042402 A1* | 3/2003 | Boertjes | ............... | H04B 10/673 250/214.1 |
| 2004/0042063 A1* | 3/2004 | Ohtani | ................ | H04B 10/0775 359/341.3 |
| 2004/0196158 A1* | 10/2004 | Sugaya | ................ | G02B 6/264 340/815.4 |
| 2005/0041968 A1* | 2/2005 | Takahashi | .......... | H04B 10/0775 398/30 |
| 2005/0225843 A1 | 10/2005 | Sugaya et al. | | |
| 2006/0274402 A1* | 12/2006 | Ghera | .................... | H01L 31/14 359/334 |
| 2008/0089681 A1* | 4/2008 | Yano | ................ | H04B 10/07955 398/33 |
| 2009/0190204 A1* | 7/2009 | Onaka | ................ | H01S 3/06758 359/334 |
| 2009/0219609 A1* | 9/2009 | Sugaya | ................ | G02B 6/264 359/334 |
| 2010/0157416 A1 | 6/2010 | Sugaya et al. | | |
| 2011/0058821 A1* | 3/2011 | Goto | ................ | H04B 10/0797 398/195 |
| 2012/0033293 A1* | 2/2012 | Zaacks | ................ | H01S 3/0014 359/341.3 |
| 2012/0224168 A1* | 9/2012 | Hirai | ................ | H04B 10/0791 356/73.1 |
| 2015/0365187 A1* | 12/2015 | Kondo | ................ | H04J 14/0221 398/38 |

FOREIGN PATENT DOCUMENTS

| | | |
|---|---|---|
| JP | 2004 279557 A | 10/2004 |
| JP | 2008 98873 A | 4/2008 |
| JP | 2009 177587 A | 8/2009 |
| JP | 2012 185235 A | 9/2012 |

OTHER PUBLICATIONS

Extended European Search Report dated Aug. 2, 2017 in Patent Application No. 14878715.3.
Office Action dated Jun. 6, 2017 in Japanese Patent Application No. 2015-557640 ( with unedited computer generated English translation).

\* cited by examiner

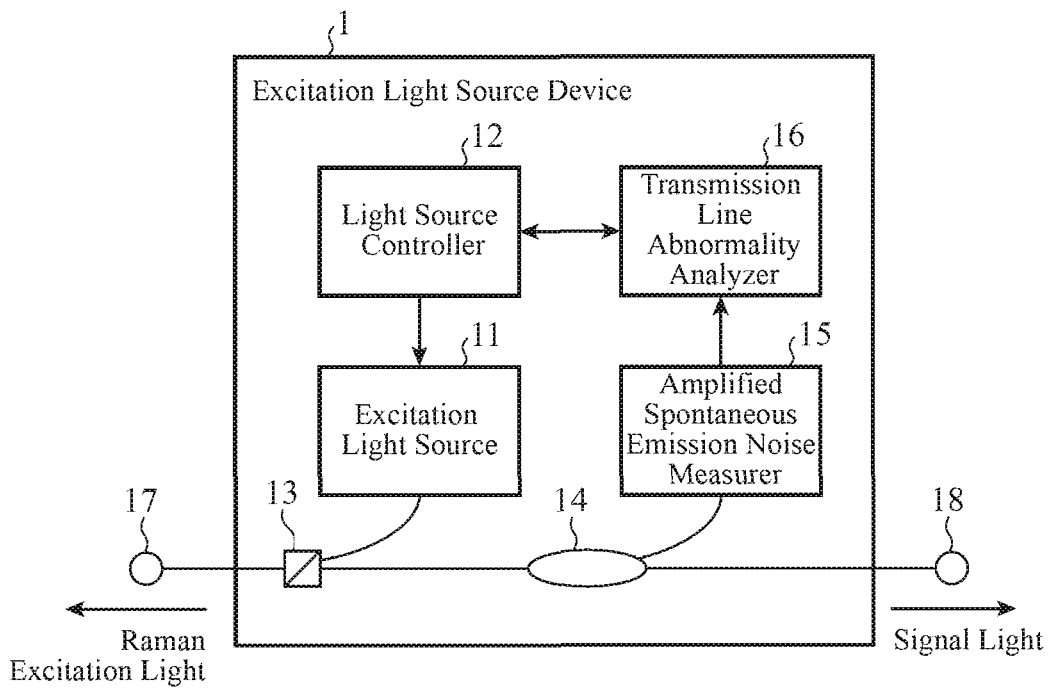

| Excitation Light Intensity [mW] | Transmission Line Abnormality Determination Threshold Value (SMF) [dB] | Transmission Line Abnormality Determination Threshold Value (DSF) [dB] |
|---|---|---|
| $X_1$ | $Z_{11}$ | $Z_{12}$ |
| $X_2$ | $Z_{21}$ | $Z_{22}$ |
| ⋮ | ⋮ | ⋮ |
| $X_n$ | $Z_{n1}$ | $Z_{n2}$ |

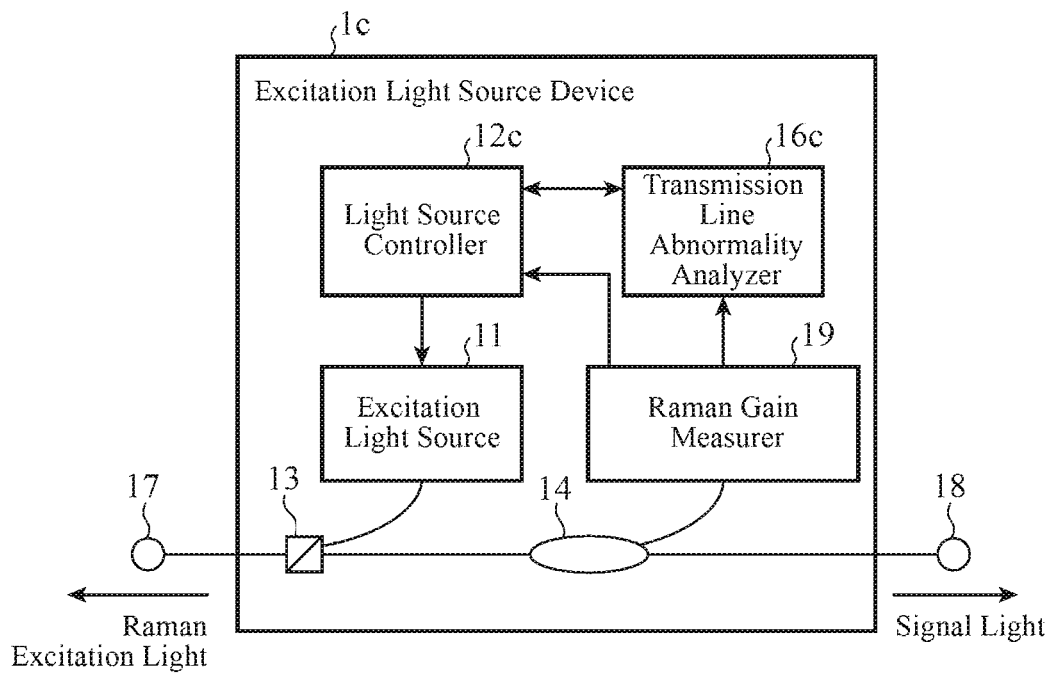

EXCITATION LIGHT SOURCE DEVICE AND OPTICAL TRANSMISSION SYSTEM

TECHNICAL FIELD

The present invention relates to an excitation light source device that outputs Raman excitation light amplifying signal light to a transmission line on which the signal light is transmitted, and also relates to an optical transmission system including the excitation light source device.

BACKGROUND ART

In a wavelength division multiplexing optical transmission system that performs long-distance transmission of an optical signal having been subjected to wavelength division multiplexing (WDM), an amplification device that amplifies the optical signal through Raman amplification is introduced. The amplification device amplifies signal light by outputting Raman excitation light with a specific wavelength to a transmission line in order to compensate for a level reduction associated with transmission, and thereby extend relay distance. Note that the level reduction as mentioned herein refers to a reduction in the intensity of signal light according to the transmission distance. In addition, the transmission line is implemented by an optical fiber for transmitting signal light, and includes connecting points such as optical connectors. Excitation light for Raman amplification to be output to the transmission line typically has a level of several hundred mW. That is a level where damage to a transmission line is concerned when there is abnormality, such as contamination or flaws, in the transmission line. Specifically, when an impurity is attached to an end surface of an optical connector, the impurity becomes an absorber of light passing through the optical connector. Due to the absorption of the light, the temperature of the optical connector increases and accordingly, for example, the transmission line may be broken. When the damage occurs in the transmission line, replacement or fusion work of the transmission line is required, which involves much effort. In addition, in general, administrators of the transmission line and the amplification device are not always identical. Therefore, there is a problem that, when an optical connector in the transmission line side is damaged, it is not easy to replace the optical connector.

In order to solve such problems mentioned above, a technique using a measuring device, so-called an OTDR (Optical Time-Domain Reflectometer) device, that monitors a reflection state in a transmission line is recommended. In this technique, by using the OTDR device, the fact that abnormal reflection has not occurred in an optical connector is measured before a device is connected, by which it is verified that contamination is not attached.

However, the OTDR device may be expensive. Thus, it is realistically impossible to install the OTDR device for each of all excitation light source devices in terms of a total cost in a system. A method for sequentially measuring for each amplifier is rather realistic. Hence, instead of a connection mode of connecting the OTDR device with the excitation light source device at all times, another connection mode is employed at a connecting point of an optical connector of the excitation light source device to change over connections of a Raman amplifier and the OTDR device. Since such the mode is employed, there is a possibility that, when the OTDR device is connected to a Raman amplifier after the OTDR device measures whether there is abnormal reflection, a foreign matter may be attached to an optical connector.

A technique for addressing these problems is presented in a Patent Literature 1. The Patent Literature 1 teaches an optical amplifier employing a method for detecting the above-described transmission line trouble. This optical amplifier allows measurement light in addition to Raman excitation light to enter a transmission line to measure a connection loss based on the reflected light and backscattered light of the measurement light that occur in the transmission line, and controls the output level of the Raman excitation light according to the connection loss.

CITATION LIST

Patent Literature 1: JP 2004-279557 A
Patent Literature 2: JP 2012-185235 A

SUMMARY OF INVENTION

However, the optical amplification device described in the Patent Literature 1 is needed to install a light source dedicated to measurement in order to detect an abnormal state of a transmission line. Thus, it may cause a problem of increasing size and cost of the optical amplification device. In addition, it may cause another problem that, when the light source for measurement breaks down, an abnormal state of the transmission line cannot be measured.

Meanwhile, a Patent Literature 2 describes an optical communication module provided with a system for detecting the above-described abnormal state of a transmission line without installing a dedicated light source, etc. The optical communication module measures an abnormal state of the transmission line based on amplified spontaneous emission noise intensity loss information, and controls the output level of Raman excitation light according to a result of the measurement.

However, the optical communication module described in the Patent Literature 2 is assumed to perform only a detection of a transmission line abnormal state in normal operation, and is configured to perform an abnormal determination on amplified spontaneous emission noise intensity in the normal operation. Hence, there is a problem that, at the time when an abnormal state of the transmission line is detected, an output level may already reach a level where a Raman excitation light source causes damage of the transmission line, and thus, the transmission line has already been damaged.

The present invention is made to solve problems such as those described above. An object of the invention is to provide an excitation light source device and an optical transmission system that are capable of detecting an abnormal state of a transmission line before the occurrence of damage to the transmission line without an additional device, and reducing the intensity of Raman excitation light when abnormality in the transmission line is detected.

An excitation light source device according to the invention includes: an excitation light source to generate the Raman excitation light; a light source controller to control an intensity of the Raman excitation light generated by the excitation light source; an amplified spontaneous emission noise measurer to measure an intensity of amplified spontaneous emission noise which is caused by the Raman excitation light generated by the excitation light source; and a transmission line abnormality analyzer to detect abnormality in the transmission line on a basis of a control state of the light source controller and a measurement result of the amplified spontaneous emission noise measurer, wherein, in a state where the abnormality is not detected by the transmission line abnormality analyzer, the light source controller controls the intensity of the Raman excitation light generated by the excitation light source to gradually increase to a set value, and wherein, in a state where the abnormality is detected by the transmission line abnormality analyzer, the light source controller controls the excitation light source to stop or reduce generation of the Raman excitation light.

An excitation light source device according to the invention includes: an excitation light source to generate the Raman excitation light; a light source controller to control an intensity of the Raman excitation light generated by the excitation light source; a Raman gain measurer to measure Raman gain which is given to the signal light and is caused by the Raman excitation light generated by the excitation light source; and a transmission line abnormality analyzer to detect abnormality in the transmission line on a basis of a control state of the light source controller and a measurement result of the Raman gain measurer, wherein, in a state where the abnormality is not detected by the transmission line abnormality analyzer, the light source controller controls the intensity of the Raman excitation light generated by the excitation light source to gradually increase to a set value, and wherein, in a state where the abnormality is detected by the transmission line abnormality analyzer, the light source controller controls the excitation light source to stop or reduce generation of the Raman excitation light.

An excitation light source device according to the invention includes: an excitation light source to generate the Raman excitation light; a Raman gain measurer to measure Raman gain which is given to the signal light and is caused by the Raman excitation light generated by the excitation light source; a light source controller to control, on a basis of a measurement result of the Raman gain measurer, an intensity of the Raman excitation light generated by the excitation light source; and a transmission line abnormality analyzer to detect abnormality in the transmission line on a basis of a control state of the light source controller and the measurement result of the Raman gain measurer, wherein, in a state where the abnormality is not detected by the transmission line abnormality analyzer, the light source controller controls the intensity of the Raman excitation light generated by the excitation light source to increase such that the Raman gain gradually increases to a set value, and wherein, in a state where the abnormality is detected by the transmission line abnormality analyzer, the light source controller controls the excitation light source to stop or reduce generation of the Raman excitation light.

According to the present invention, since the devices are configured in the above-described manner, an abnormal state of a transmission line can be detected prior to the occurrence of damage to the transmission line without an additional device. Furthermore, when the abnormality in the transmission line is detected, the intensity of Raman excitation light can be reduced.

BRIEF DESCRIPTION OF DRAWINGS

FIG. 1 is a diagram representing a configuration of an excitation light source device according to an Embodiment 1 of the invention.

FIG. 2 is a diagram representing an example of a reference table used in the excitation light source device according to the Embodiment 1 of the invention.

FIG. 11 is a diagram representing a configuration of an excitation light source device according to an Embodiment 3 of the invention.

FIG. 12 is a diagram representing an example of a reference table used in the excitation light source device according to the Embodiment 3 of the invention.

DESCRIPTION OF EMBODIMENTS

Figure 3:
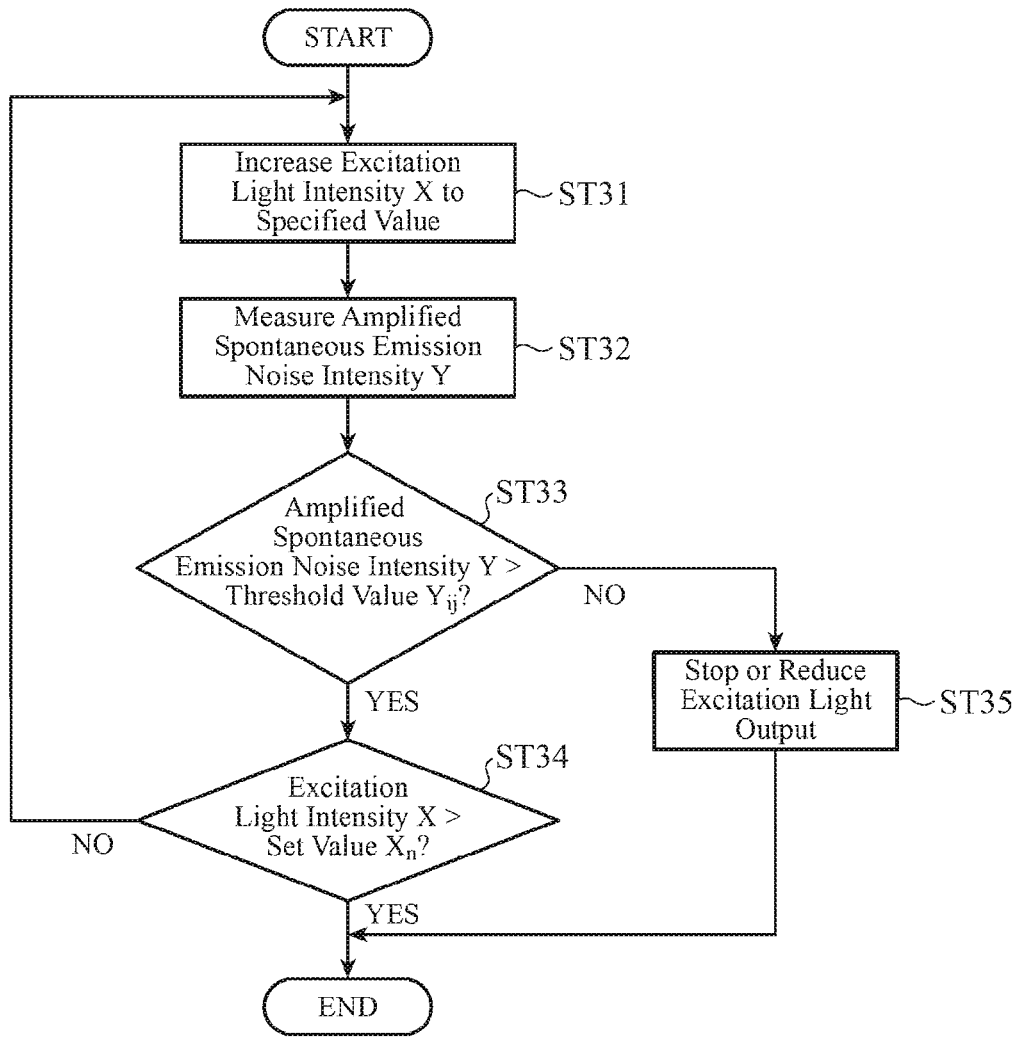
FIG. 3 is a flowchart representing the operation of the excitation light source device according to the Embodiment 1 of the invention.

Embodiments of the invention will be described in detail below with reference to the drawings.

Embodiment 1

In an Embodiment 1, is explained that a system for detecting abnormality in a transmission line based on the state of supply of Raman excitation light (hereinafter, simply referred to as "excitation light") and the intensity of amplified spontaneous emission noise caused by the excitation light.

FIG. 1 is a diagram representing a configuration of an excitation light source device 1 according to the Embodiment 1 of the invention.

The excitation light source device 1 is to output excitation light that amplifies signal light to a transmission line on which the signal light is transmitted. As shown in FIG. 1, the excitation light source device 1 includes an excitation light source 11, a light source controller 12, a multiplexer 13, a branching device 14, an amplified spontaneous emission noise measurer 15, and a transmission line abnormality analyzer 16.

Note that the transmission line is implemented by an optical fiber. Signal light (main signal light) flowing through the transmission line is input (or received) through a port 17 of the excitation light source device 1 and output through a port 18. The excitation light source device 1 outputs (or sends) generated excitation light to the transmission line through the port 17.

Note that FIG. 1 shows a case in which in an optical transmission system including the transmission line and the excitation light source device 1, the excitation light source device 1 is disposed in the downstream side of the transmission line (i.e., a backward excitation system). However, the configuration is not limited thereto. The excitation light source device 1 of the present invention may be disposed in the upstream side of the transmission line to output excitation light toward the downstream side (i.e., a forward excitation system). Alternatively, the excitation light source device 1 of the present invention may be disposed in both the upstream and downstream sides of the transmission line (i.e., a bidirectional excitation system).

Next, each component of the excitation light source device 1 will be described.

The excitation light source 11 is to generate excitation light that amplifies signal light on the transmission line.

The light source controller 12 is to control the intensity of the excitation light generated by the excitation light source 11 on a basis of a result of analysis by the transmission line abnormality analyzer 16. In a state where abnormality is not detected by the transmission line abnormality analyzer 16, the light source controller 12 gradually increases, to a set value, the intensity of the excitation light generated by the excitation light source 11. On the other hand, when the abnormality is detected by the transmission line abnormality analyzer 16, the light source controller 12 stops or reduces generation of the excitation light by the excitation light source 11. The light source controller 12 can be implemented by using, for example, a microcomputer or an FPGA (Field Programmable Gate Array).

The multiplexer 13 is to multiplex input light from two systems.

The branching device 14 is to branch a part of the input light and output the branched light to the two systems.

The amplified spontaneous emission noise measurer 15 is to measure the intensity of amplified spontaneous emission noise, which is caused by the excitation light generated by the excitation light source 11. The amplified spontaneous emission noise measurer 15 measures the intensity of the amplified spontaneous emission noise, which is caused in the transmission line by the excitation light from the excitation light source 11 and which propagates in the opposite direction to an advancing direction of the excitation light.

The transmission line abnormality analyzer 16 is to detect abnormality in the transmission line on a basis of the control state (i.e., the state of supply of excitation light) by the light source controller 12 and a result of the measurement by the amplified spontaneous emission noise measurer 15. The transmission line abnormality analyzer 16 contains a reference table 161 used for detecting abnormality in the transmission line. As shown in FIG. 2, the reference table 161 is a storage area that stores gradual values [mW] up to a set value of the intensity of excitation light, and transmission line abnormality determination threshold values (hereinafter, simply referred to as "threshold values") [dBm] for amplified spontaneous emission noise intensity for each type of optical fiber used as the transmission line. Note that it is assumed that the transmission line abnormality analyzer 16 has information about the type of optical fiber used as the transmission line by means of management communication performed beforehand, etc.

In the reference table 161 shown in FIG. 2, the rows indicate values $X_i$ (i=1 to n) for the respective levels up to a set value $X_n$ of the intensity of excitation light, and the columns indicate the types of optical fiber (SMF (Single-Mode Fiber) and DSF (Dispersion Shifted Fiber)). There are also shown threshold values $Y_{ij}$; (i=1 to n; j=1 or 2) set for the respective values $X_i$ and types. Note that although FIG. 2 shows a case in which there are two types of optical fiber, there may be three or more types.

When a threshold value set for the type of the optical fiber in use and the intensity of excitation light controlled by the light source controller 12 is not exceeded by the intensity of amplified spontaneous emission noise measured at that time by the amplified spontaneous emission noise measurer 15, the transmission line abnormality analyzer 16 judges, by referring to the rows and columns of the reference table 161, the transmission line is in abnormal. Note that the reference table 161 is not limited to the one shown in FIG. 2, and may be any as long as the table functions as a reference table, and thus various types of reference tables can be used.

Next, transmission line abnormality detection by the excitation light source device 1 configured in the above-described manner and the stop/reduction operation of the excitation light source 11 will be described with reference to FIG. 3. Note that the excitation light source device 1 performs a process depicted in FIG. 3 at all times. Note also that it is assumed that the transmission line abnormality analyzer 16 has information about the type of optical fiber used as the transmission line by means of management communication performed beforehand, etc.

In the transmission line abnormality detection by the excitation light source device 1 and the stop/reduction operation of the excitation light source 11, as shown in FIG. 3, the light source controller 12 increases the intensity X of excitation light generated by the excitation light source 11 to a specified value (step ST31). The light source controller 12 gives information indicating the controlled intensity X of excitation light to the transmission line abnormality analyzer 16.

The amplified spontaneous emission noise measurer 15 measures the intensity Y of amplified spontaneous emission noise which is caused by the excitation light generated by the excitation light source 11 (step ST32). The amplified spontaneous emission noise measurer 15 gives information indicating the measured intensity Y of amplified spontaneous emission noise to the transmission line abnormality analyzer 16.

The transmission line abnormality analyzer 16 determines, by referring to the reference table 161, whether a threshold value $Y_{ij}$, which is set for the type of optical fiber in use and the intensity X of excitation light controlled by the light source controller 12, is exceeded by the intensity Y of amplified spontaneous emission noise measured at that time by the amplified spontaneous emission noise measurer 15 (step ST33).

When the transmission line abnormality analyzer 16 judges at the step ST33 that the threshold value $Y_{ij}$ is exceeded by the intensity Y of amplified spontaneous emission noise, the transmission line abnormality analyzer 16 judges that there is no abnormality in the transmission line. In this case, the transmission line abnormality analyzer 16 determines, by referring to the reference table 161, whether the intensity X of excitation light controlled by the light source controller 12 exceeds a set value $X_n$ (step ST34). When the transmission line abnormality analyzer 16 judges at this step ST34 that the intensity X of excitation light exceeds the set value $X_n$, the sequence is ended.

On the other hand, when the transmission line abnormality analyzer 16 judges at step ST34 that the intensity X of excitation light does not exceed the set value $X_n$, the sequence returns to step ST31. Thereafter, processes at steps ST31 to ST33 are repeated.

Furthermore, when the transmission line abnormality analyzer 16 judges at step ST33 that the threshold value $Y_{ij}$ is not exceeded by the intensity Y of amplified spontaneous emission noise, the transmission line abnormality analyzer 16 judges that there is abnormality in the transmission line. Thus, the light source controller 12 stops or reduces the generation of excitation light by the excitation light source 11 (step ST35). Thereafter, an operator cleans up the transmission line, and after contamination of the transmission line is removed, operation of optical communication is resumed.

In addition, when the transmission line abnormality analyzer 16 detects abnormality in the transmission line, the transmission line abnormality analyzer 16 generates, for example, an alarm to notify all network devices of the optical transmission system or a network administrator of the occurrence of abnormality in the transmission line.

Note that the reference table 161 shown in FIG. 2 shows a case in which threshold values are set for each fiber type. However, the configuration is not limited thereto, and for example, losses caused by optical connector connections may be taken into account in computation of threshold values and the threshold values may be set for each number of optical connector connections. In this case, it is assumed that the transmission line abnormality analyzer 16 has information about the number of optical connector connections in the transmission line by means of management communication performed beforehand, etc.

The reason that abnormality in the transmission line can be detected by monitoring the intensity of amplified spontaneous emission noise will be described below with reference to FIGS. 4, 5A and 5B.

Figure 4:
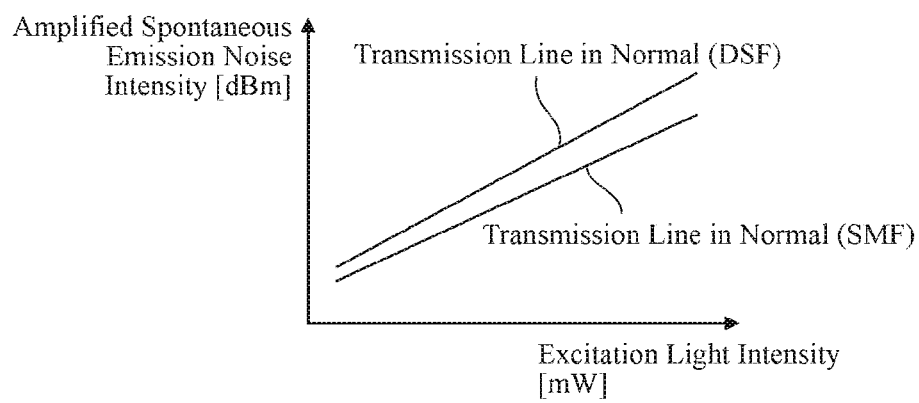
FIG. 4 is a diagram representing a relationship between excitation light intensity and amplified spontaneous emission noise intensity for each type of optical fiber.
Figure 5A:
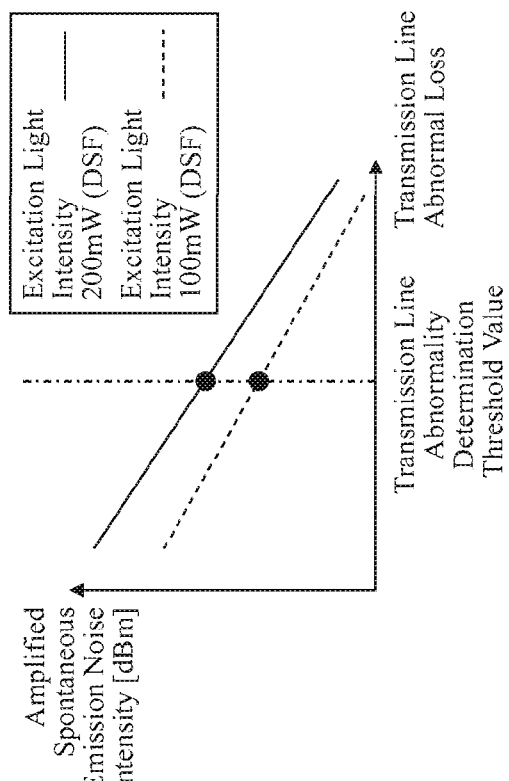
FIG. 5A is a diagram representing relationships between excitation light intensity and amplified spontaneous emission noise intensity for when a transmission line is in normal and in abnormal.
Figure 5B:
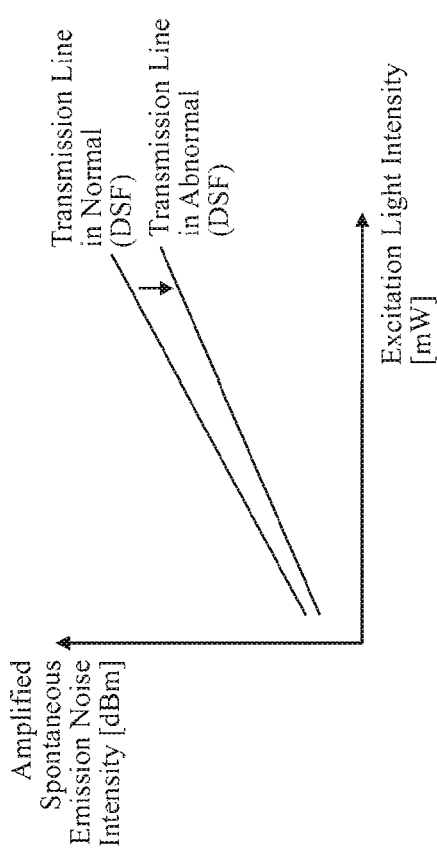
FIG. 5B is a diagram representing relationships between amplified spontaneous emission noise intensity and transmission line abnormal loss.

As shown in FIG. 4, when transmission lines are in normal, the intensity of amplified spontaneous emission noise caused by Raman amplification is specified by the intensity of excitation light and a cross section of an optical fiber. On the other hand, as shown in FIG. 5A, when there is a loss in the transmission line due to contamination of an end surface of an optical connector, etc. (i.e., when the transmission line is in abnormal), the intensity of excitation light in the transmission line decreases, and accordingly, the intensity of amplified spontaneous emission noise also decreases. Namely, as shown in FIG. 5B, when the intensity of excitation light and the type of optical fiber are input as pre-information, the intensity of amplified spontaneous emission noise depends on a loss caused by abnormality in the transmission line.

In the Embodiment 1, abnormality in the transmission line is detected by focusing attention on the phenomenon discussed above. For example, when there is a loss in the transmission line due to contamination of an optical connector, the intensity of amplified spontaneous emission noise decreases depending on the magnitude of the loss. That is, when the intensity of excitation light and the type of optical fiber are input as pre-information, abnormality in the transmission line can be detected by measuring the intensity of amplified spontaneous emission noise.

Note that the amplification principle of an optical Raman amplifier involved in the present invention uses stimulated Raman scattering which is a nonlinear optical effect of an optical fiber. Specifically, a phenomenon is used where, when the total power of an optical signal passing through the transmission line exceeds a specific threshold value, stimulated Raman scattering light (i.e., amplified spontaneous emission noise) is generated on the long-wavelength side of the order of 100 nm from the optical signal.

As described above, according to the Embodiment 1, it is configured such that the intensity of excitation light generated by the excitation light source 11 is gradually increased from a low value at which transmission line abnormality does not occur, and it is determined, based on the intensity of amplified spontaneous emission noise generated at that time, whether there is abnormality in a transmission line, and if abnormality is detected, the generation of excitation light by the excitation light source 11 is stopped or reduced. Therefore, without an additional device, an abnormal state of the transmission line can be detected before the occurrence of damage to the transmission line. Furthermore, when abnormality in the transmission line is detected, the intensity of excitation light can be reduced.

As a result, a light source for transmission line abnormality detection can be eliminated from the excitation light source device 1. Hence, compared to the conventional configurations, miniaturization and cost reduction of the excitation light source device 1 can be achieved. In addition, since transmission line abnormality can be detected by the excitation light source device 1 alone, the content of control and content of adjustment required can be simplified over the conventional configurations.

Note that, when the excitation light source device 1 is applied to the forward excitation system or the bidirectional excitation system, the amplified spontaneous emission noise measurer 15 of the excitation light source device 1 disposed on the upstream side of the transmission line measures a loss of amplified spontaneous emission noise that propagates in the same direction (i.e., a forward direction) as that of main signal light.

Embodiment 2

In an Embodiment 2, it is explained that a system for detecting abnormality in a transmission line on a bases of the state of supply of excitation light, and Raman gain which is given to signal light and is caused by the excitation light.

Figures 6, 7:
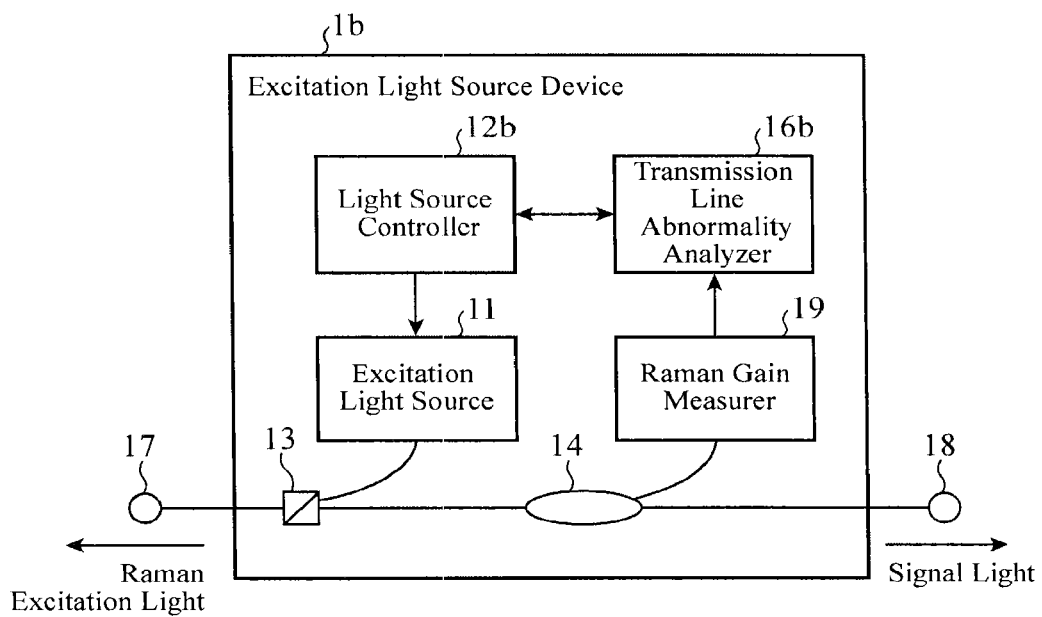
FIG. 6 is a diagram representing a configuration of an excitation light source device according to an Embodiment 2 of the invention.
FIG. 7 is a diagram representing an example of a reference table used in the excitation light source device according to the Embodiment 2 of the invention.

FIG. 6 is a diagram representing a configuration of an excitation light source device 1b according to the Embodiment 2 of the invention. The excitation light source device 1b according to the Embodiment 2 shown in FIG. 6 is configured such that, an amplified spontaneous emission noise measurer 15 of an excitation light source device 1 according to the Embodiment 1 shown in FIG. 1 is removed, and a Raman gain measurer 19 is introduced. Furthermore, a light source controller 12 and a transmission line abnormality analyzer 16 are changed to a light source controller 12b and a transmission line abnormality analyzer 16b. Other configurations are the same and thus are denoted by the same reference signs, and description thereof is omitted.

The light source controller 12b is to control the intensity of excitation light generated by an excitation light source 11 on a basis of a result of analysis by the transmission line abnormality analyzer 16b. In a state where abnormality is not detected by the transmission line abnormality analyzer 16b, the light source controller 12b gradually increases the intensity of excitation light generated by the excitation light source 11 to a set value. When the abnormality is detected by the transmission line abnormality analyzer 16b, the light source controller 12b stops or reduces the generation of excitation light by the excitation light source 11. The light source controller 12b can be implemented by using, for example, a microcomputer or an FPGA (Field Programmable Gate Array).

The Raman gain measurer 19 is to measure Raman gain that is given to signal light and is caused by the excitation light generated by the excitation light source 11. The Raman gain measurer 19 measures Raman gain that is given to main signal light and is generated by means of a Raman amplification effect occurring in a transmission line due to the excitation light from the excitation light source 11. Note that the Raman gain is not a general gain that is represented by a ratio of input optical power to output optical power, but is represented by a ratio of output optical power obtained upon non-excitation to output optical power obtained upon excitation.

The transmission line abnormality analyzer 16b is to detect abnormality in the transmission line on a basis of the control state (the state of supply of excitation light) of the light source controller 12b and a measurement result of the Raman gain measurer 19. The transmission line abnormality analyzer 16b has a reference table 161b for detecting abnormality in the transmission line. As shown in FIG. 7, the reference table 161b is a storage area that stores gradual values [mW] up to a set value of the intensity of excitation light, and threshold values [dB] for Raman gain for each type of optical fiber. Note that it is assumed that the transmission line abnormality analyzer 16b has information about the type of optical fiber used as the transmission line by means of management communication performed beforehand, etc.

In the reference table 161b shown in FIG. 7, the rows indicate values $X_i$ (i=1 to n) for the respective levels up to a set value $X_n$ of the intensity of excitation light, and the columns indicate the types of optical fiber (SMF and DSF). There are shown threshold values $Z_{ij}$ (i=1 to n and j=1 or 2) set for the respective values $X_i$ and types. Note that, although FIG. 7 shows a case in which there are two types of optical fiber, there may be three or more types.

When the transmission line abnormality analyzer 16b determines, by referring to the rows and columns of the reference table 161b, that a threshold value set for the type of optical fiber in use and the intensity of excitation light controlled by the light source controller 12b is not exceeded by the intensity of Raman gain measured at that time by the Raman gain measurer 19, the transmission line abnormality analyzer 16b judges that the transmission line is in abnormal. Note that the reference table 161b is not limited to the one shown in FIG. 7, and may be any as long as the table functions as a reference table, and thus various types of reference tables can be used.

Next, transmission line abnormality detection by the excitation light source device 1b configured in the above-described manner and the stop/reduction operation of the excitation light source 11 will be described with reference to FIG. 8. Note that the excitation light source device 1b performs processes shown in FIG. 8 at all times. Note also that it is assumed that the transmission line abnormality analyzer 16b has information about the type of optical fiber used as the transmission line by means of management communication performed beforehand, etc.

Figure 8:
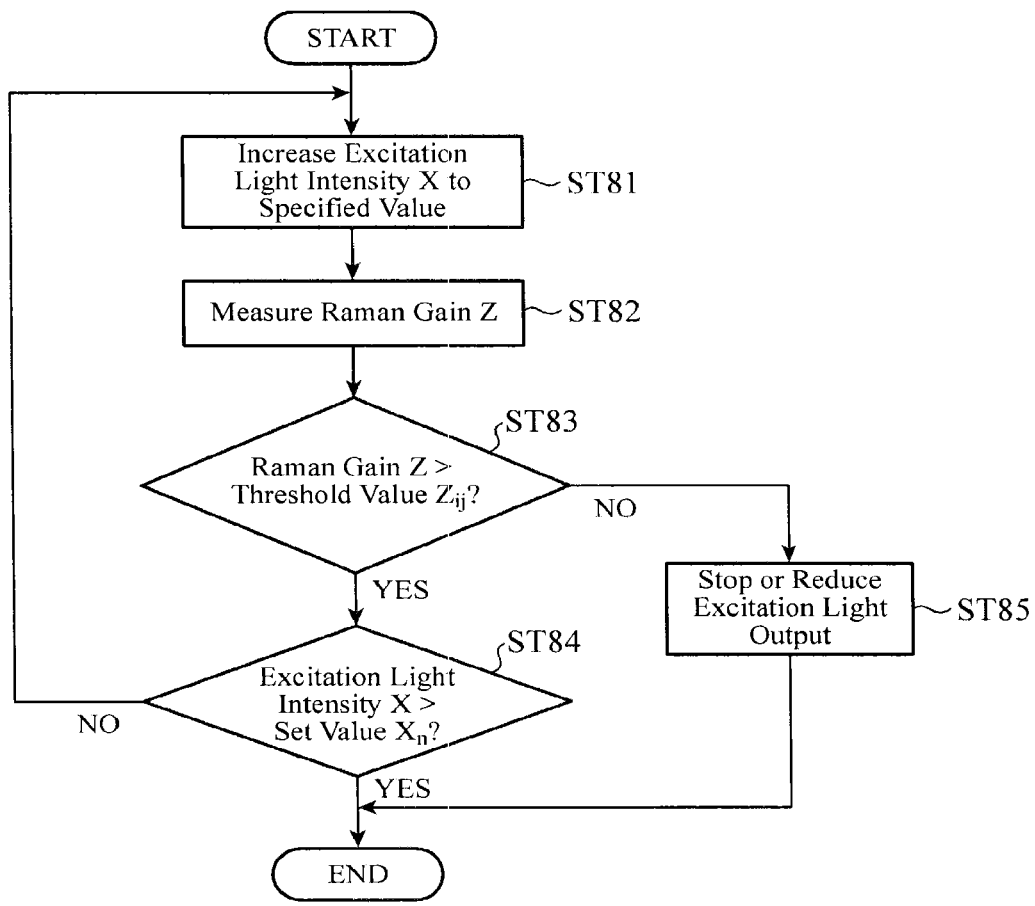
FIG. 8 is a flowchart representing the operation of the excitation light source device according to the Embodiment 2 of the invention.

In the transmission line abnormality detection by the excitation light source device 1b and the stop/reduction operation of the excitation light source 11, as shown in FIG. 8, first, the light source controller 12b increases the intensity X of excitation light generated by the excitation light source 11 to a specified value (step ST81). The light source controller 12b gives information indicating the controlled intensity X of excitation light to the transmission line abnormality analyzer 16b.

The Raman gain measurer 19 measures Raman gain Z that is given to signal light caused by the excitation light generated by the excitation light source 11 (step ST82). The Raman gain measurer 19 gives information indicating the measured Raman gain Z to the transmission line abnormality analyzer 16b.

The transmission line abnormality analyzer 16b determines, by referring to the reference table 161b, whether a threshold value $Z_{ij}$, which is set for the type of optical fiber in use and the intensity X of excitation light controlled by the light source controller 12b, is exceeded by the Raman gain Z measured at that time by the Raman gain measurer 19 (step ST83).

When the transmission line abnormality analyzer 16b judges at the step ST83 that the threshold value $Z_{ij}$ is exceeded by the Raman gain Z, the transmission line abnormality analyzer 16b judges that there is no abnormality in the transmission line. In this case, the transmission line abnormality analyzer 16b determines, by referring to the reference table 161b, whether the intensity X of excitation light controlled by the light source controller 12b exceeds a set value $X_n$ (step ST84). When the transmission line abnormality analyzer 16b judges at this step ST84 that the intensity X of excitation light exceeds the set value $X_n$, the sequence is ended.

On the other hand, when the transmission line abnormality analyzer 16b judges at step ST84 that the intensity X of excitation light does not exceed the set value $X_n$, the sequence realms to step ST81. Thereafter, processes at steps ST81 to ST83 are repeated.

Furthermore, when the transmission line abnormality analyzer 16b judges at step ST83 that the threshold value $Z_{ij}$ is not exceeded by the Raman gain Z, the transmission line abnormality analyzer 16b judges that there is abnormality in the transmission line. Thus, the light source controller 12b stops or reduces the generation of excitation light by the excitation light source 11 (step ST85). Thereafter, an operator cleans up the transmission line, and after contamination of the transmission line is removed, operation of optical communication is resumed.

In addition, when the transmission line abnormality analyzer 16b detects abnormality in the transmission line, the transmission line abnormality analyzer 16b generates, for example, an alarm to notify all network devices of an optical transmission system or a network administrator of the occurrence of abnormality in the transmission line.

Note that the reference table 161b shown in FIG. 7 shows a case in which threshold values are set for each type of optical fiber. However, the configuration is not limited thereto, and for example, losses caused by optical connector connections may be taken into account in computation of threshold values and the threshold values may be set for each number of optical connector connections. In this case, it is assumed that the transmission line abnormality analyzer 16b has information about the number of optical connector connections in the transmission line by means of management communication performed beforehand, etc.

The reason that abnormality in the transmission line can be detected by monitoring Raman gain will be described below with reference to FIGS. 9, 10A and 10B.

Figure 9:
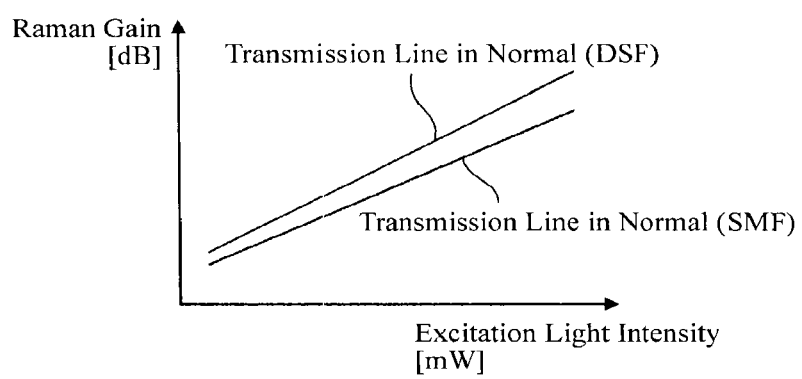
FIG. 9 is a diagram representing relationships between excitation light intensity and Raman gain.
Figure 10B:
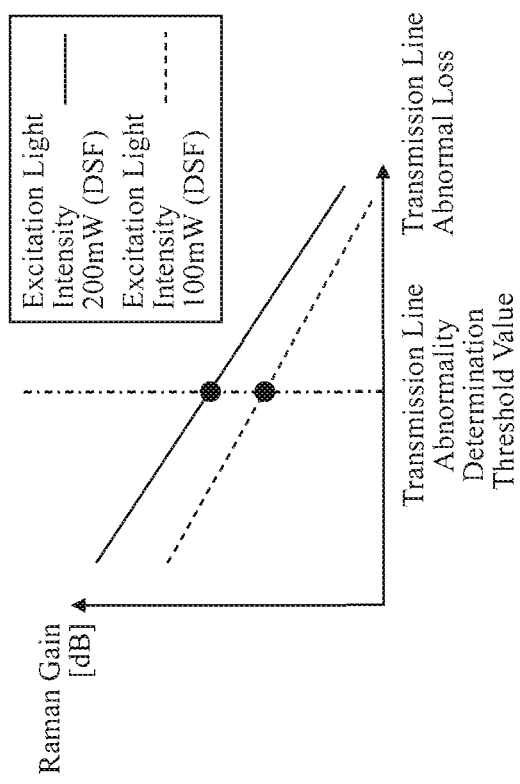
FIG. 10B is a diagram representing relationships between Raman gain and transmission line abnormal loss.
Figure 10A:
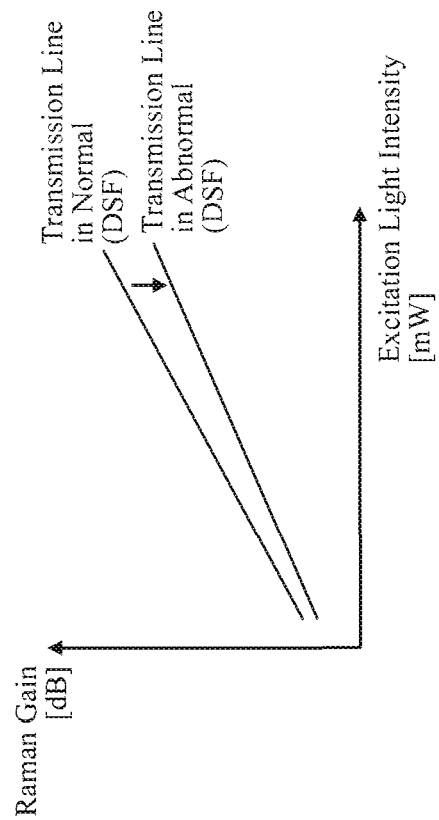
FIG. 10A is a diagram representing relationships between excitation light intensity and Raman gain for when a transmission line is in normal and in abnormal.

As shown in FIG. 9, when transmission lines are in normal, Raman gain generated by Raman amplification is determined by the intensity of excitation light and the cross section of an optical fiber. On the other hand, as shown in FIG. 10A, when there is a loss in the transmission line due to contamination of an optical connector end surface, etc. when the transmission line is in abnormal), the intensity of excitation light in the transmission line decreases, and accordingly, the Raman gain also decreases. Namely, as shown in FIG. 10B, when the intensity of excitation light and the type of optical fiber are input as pre-information, the Raman gain depends on a loss caused by abnormality in the transmission line.

In the Embodiment 2, abnormality in the transmission line is detected by focusing attention on the phenomenon discussed above. For example, when there is a loss in the transmission line due to contamination of an optical connector, the Raman gain decreases according to the magnitude of the loss. That is, when the intensity of excitation light and the type of optical fiber are input as pre-information, abnormality in the transmission line can be detected by measuring Raman gain.

Note that the Raman gain measurer 19 may measure Raman gain that is given to light for monitoring and control, instead of the main signal light.

As described above, according to the Embodiment 2, even when it is configured such that abnormality in a transmission line is detected based on the state of supply of excitation light and Raman gain which is given to signal light caused by the excitation light, the same effects as those of the Embodiment 1 can be obtained.

Embodiment 3

In an Embodiment 3, it is explained that a system for controlling the intensity of excitation light to obtain Raman gain following a target value, and detecting abnormality in a transmission line based on the intensity of excitation light controlled at that time.

FIG. 11 is a configuration diagram representing an excitation light source device 1c according to the Embodiment 3 of the invention. The excitation light source device 1c according to the Embodiment 3 shown in FIG. 11 is such that a light source controller 12b and a transmission line abnormality analyzer 16b of an excitation light source device 1b according to the Embodiment 2 shown in FIG. 6 are changed to a light source controller 12c and a transmission line abnormality analyzer 16c. Other configurations are the same and thus are denoted by the same reference signs and description thereof is omitted.

The light source controller 12c is to control the intensity of excitation light generated by an excitation light source 11 on a basis of a result of measurement by a Raman gain measurer 19 and a result of analysis by the transmission line abnormality analyzer 16c. In a state where abnormality is not detected by the transmission line abnormality analyzer 16c, the light source controller 12c gradually increases the intensity of excitation light generated by the excitation light source 11 so as to gradually increase Raman gain measured by the Raman gain measurer 19 to a target value. When the abnormality is detected by the transmission line abnormality analyzer 16c, the light source controller 12c stops or reduces the generation of excitation light by the excitation light source 11. The light source controller 12c can be implemented by using, for example, a microcomputer or an FPGA (Field Programmable Gate Array).

The transmission line abnormality analyzer 16c is to detect abnormality in a transmission line on a basis of the control state (the state of supply of excitation light) by the light source controller 12c and a result of measurement by the Raman gain measurer 19. The transmission line abnormality analyzer 16c has a reference table 161c for detecting abnormality in the transmission line. As shown in FIG. 12, the reference table 161c is a storage area that stores gradual values [dB] up to a set value of Raman gain, and threshold values [mW] for the intensity of excitation light for each type of optical fiber. Note that it is assumed that the transmission line abnormality analyzer 16c has information about the type of optical fiber used as the transmission line by means of management communication performed beforehand, etc.

In the reference table 161c shown in FIG. 12, the rows indicate values $Z_i$ (i=1 to n) for the respective levels up to a target value $Z_n$ of Raman gain, and the columns indicate the types of optical fiber (SMF and DSF). There are shown threshold values $X_{ij}$ (i=1 to n and j=1 or 2) set for the respective values $Z_i$ and types. Note that, although FIG. 12 shows a case in which there are two types of optical fiber, there may be three or more types.

When the transmission line abnormality analyzer 16c determines, by referring to the rows and columns of the reference table 161c, that a threshold value set for the type of optical fiber in use and Raman gain measured by the Raman gain measurer 19 is not exceeded by the intensity of excitation light controlled at that time by the light source controller 12c, the transmission line abnormality analyzer 16c judges that the transmission line is in abnormal. Note that the reference table 161c is not limited to the one shown in FIG. 12, and may be any as long as the table functions as a reference table, and thus various types of reference tables can be used.

Here, for a system for controlling a drive current of the excitation light source 11 by the light source controller 12c, it is preferred to use an automatic gain control (AGC) system. The simplest control mode for the case of the auto gain control is a method for changing the intensity of output from the excitation light source 11 such that the Raman gain monitored by the Raman gain measurer 19 follows a target value.

Next, transmission line abnormality detection by the excitation light source device 1c configured in the above-described manner and the stop/reduction operation of the excitation light source 11 will be described with reference to FIG. 13. Note that the excitation light source device 1c performs processes shown in FIG. 13 at all times. Note also that it is assumed that the transmission line abnormality analyzer 16c has information about the type of optical fiber used as the transmission line by means of management communication performed beforehand, etc.

Figure 13:
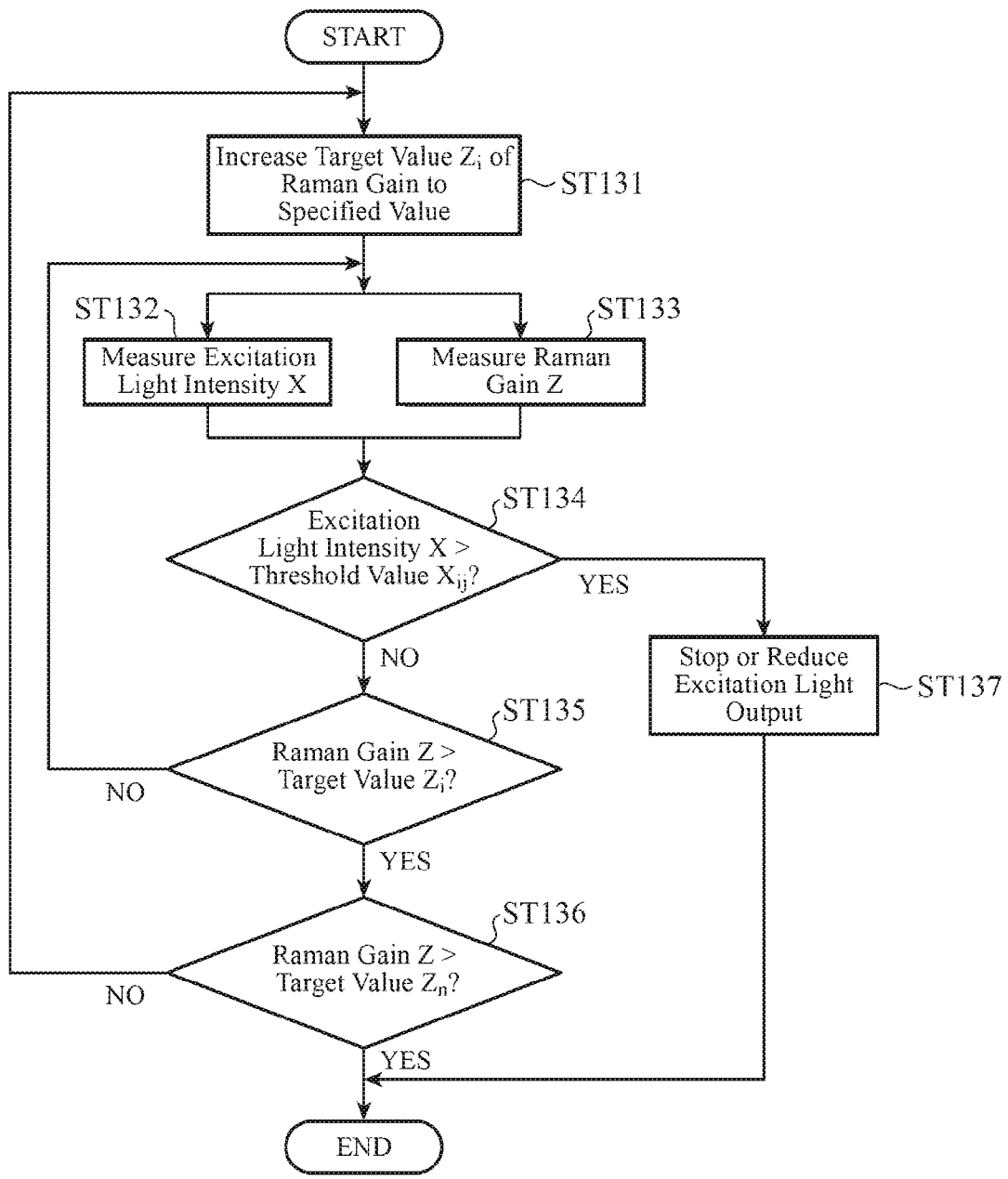
FIG. 13 is a flowchart representing the operation of the excitation light source device according to the Embodiment 3 of the invention.

In the transmission line abnormality detection by the excitation light source device 1.c and the stop/reduction operation of the excitation light source 11, as shown in FIG. 13, first, the light source controller 12c increases the intensity X of excitation light generated by the excitation light source 11, such that Raman gain Z follows a target value $Z_i$ by increasing the Raman gain Z to a specified value according to the auto gain control system (step ST131).

The light source controller 12c measures the controlled intensity X of excitation light (step ST132). Then, the light source controller 12c gives information indicating the controlled intensity X of excitation light to the transmission line abnormality analyzer 16c.

The Raman gain measurer 19 measures Raman gain Z that is given to signal light caused by the excitation light generated by the excitation light source 11 (step ST133). The Raman gain measurer 19 gives information indicating the measured Raman gain Z to the transmission line abnormality analyzer 16c.

The transmission line abnormality analyzer 16c determines, by referring to the reference table 161c, whether a threshold value $X_{ij}$ set for the type of optical fiber in use and the Raman gain Z measured by the Raman gain measurer 19 is exceeded by the intensity X of excitation light controlled at that time by the light source controller 12c (step ST134).

When the transmission line abnormality analyzer 16c judges at this step ST134 that the threshold value $X_{ij}$ is exceeded by the intensity X of excitation light, the transmission line abnormality analyzer 16c determines, by referring to the reference table 161c, whether the Raman gain Z measured by the Raman gain measurer 19 has reached the target value $Z_i$ set at step ST131 (step ST135).

When the transmission line abnormality analyzer 16c judges at this step ST135 that the Raman gain Z has reached the target value $Z_i$ set at step ST131, the transmission line abnormality analyzer 16c determines, by referring to the reference table 161c, whether the Raman gain Z measured by the Raman gain measurer 19 exceeds a target value (value for normal operation) $Z_n$ (step ST136). When the transmission line abnormality analyzer 16c judges at this step ST136 that the Raman gain Z exceeds the target value $Z_n$, the sequence is ended.

On the other hand, when the transmission line abnormality analyzer 16c judges at step ST136 that the Raman gain Z does not exceed the target value $Z_n$, the sequence returns to step ST131.

When the transmission line abnormality analyzer 16c judges at step ST135 that the Raman gain Z has not reached the target value $Z_i$, the sequence returns to steps ST132 and ST133.

When the transmission line abnormality analyzer 16c judges at step ST134 that the threshold value $X_{ij}$ is not exceeded by the intensity X of excitation light, the transmission line abnormality analyzer 16c judges that there is abnormality in the transmission line. The light source controller 12c stops or reduces the generation of excitation light by the excitation light source 11 (step ST137). Thereafter, an operator cleans up the transmission line, and when contamination of the transmission line is removed, operation of optical communication is resumed.

As described above, according to the Embodiment 3, even when it is con red such that the intensity of excitation light is controlled such that Raman gain follows a target value, and abnormality in a transmission line is detected based on the intensity of excitation light controlled at that time, the same effects as those of the Embodiment 2 can be obtained.

Note that in the invention of the present application, free combination of the embodiments, or modifications to any component of the embodiments, or omission of any component of the embodiments may be made without departing from the sprit and scope of the invention.

The Excitation light source devices and the optical transmission systems according to the present invention can detect an abnormal state of a transmission line before the occurrence of damage to the transmission line without an additional device, and can reduce the output level of Raman excitation light when abnormality in the transmission line is detected. Thus, the excitation light source devices and the optical transmission systems are suitable for use as, for example, excitation light source devices that output Raman excitation light that amplifies signal light to a transmission line on which the signal light is transmitted, and optical transmission systems including the excitation light source devices.

1, 1b, and 1c: excitation light source device, 11: excitation light source, 12, 12b, and 12c: light source controller, 13: multiplexer, 14: branching device, 15: amplified spontaneous emission noise measurer, 16, 16b, and 16c: transmission line abnormality analyzer, 17 and 18: port, 19: Raman gain measurer, and 161, 161b, and 161c: reference table

The invention claimed is:

1. An excitation light source device that outputs Raman excitation light amplifying signal light to a transmission line on which the signal light is transmitted, the excitation light source device comprising:
   an excitation light source to generate the Raman excitation light;
   a light source controller to control an intensity of the Raman excitation light generated by the excitation light source and output intensity information indicating the controlled intensity;
   an amplified spontaneous emission noise measurer to measure an intensity of amplified spontaneous emission noise which is caused by the Raman excitation light generated by the excitation light source; and
   a transmission line abnormality analyzer to detect abnormality in the transmission line on a basis of a comparison between a threshold value of an amplified spontaneous emission noise and a measurement result of the amplified spontaneous emission noise measurer, the threshold value being specified by a combination of a type of an optical fiber constituting the transmission line and an intensity of a Raman excitation light indicated by the intensity information,
   wherein the transmission line abnormality analyzer is configured to judge that
      the transmission line is not in abnormal when the measurement result of the amplified spontaneous emission noise exceeds the threshold value, and
      the transmission line is in abnormal when the measurement result of the amplified spontaneous emission noise does not exceed the threshold value,
   wherein, in a state where the transmission line abnormality analyzer judges that the transmission line is not in abnormal, the light source controller controls the intensity of the Raman excitation light generated by the excitation light source to gradually increase to a set value, and
   wherein, in a state where the transmission line abnormality analyzer judges that the transmission line is in abnormal, the light source controller controls the excitation light source to stop or reduce generation of the Raman excitation light.

2. The excitation light source device according to claim 1, wherein the transmission line abnormality analyzer is configured to
   contain a reference table in which correspondence between gradual values of intensities of Raman excitation light and threshold values of amplified spontaneous emission noise is set for each type of optical fibers, and
   obtain, from the reference table, the threshold value used for the judgment on abnormality of the transmission line.

3. An excitation light source device that outputs Raman excitation light amplifying signal light to a transmission line on which the signal light is transmitted, the excitation light source device comprising:
   an excitation light source to generate the Raman excitation light;
   a light source controller to control an intensity of the Raman excitation light generated by the excitation light source and output intensity information indicating the controlled intensity;

a Raman gain measurer to measure Raman gain which is given to the signal light and is caused by the Raman excitation light generated by the excitation light source; and a transmission line abnormality analyzer to detect abnormality in the transmission line on a basis of a comparison between a threshold value of Raman gain and a measurement result of the Raman gain measurer, the threshold value being specified by a combination of a type of an optical fiber constituting the transmission line and an intensity of a Raman excitation light indicated by the intensity information, wherein the transmission line abnormality analyzer is configured to judge that the transmission line is not in abnormal when the measurement result of the amplified spontaneous emission noise exceeds the threshold value, and the transmission line is in abnormal when the measurement result of the amplified spontaneous emission noise does not exceed the threshold value, wherein, in a state where the transmission line abnormality analyzer judges that the transmission line is not in abnormal, the light source controller controls the intensity of the Raman excitation light generated by the excitation light source to gradually increase to a set value, and wherein, in a state where the transmission line abnormality analyzer judges that the transmission line is in abnormal, the light source controller controls the excitation light source to stop or reduce generation of the Raman excitation light.

4. The excitation light source device according to claim 3, wherein the transmission line abnormality analyzer is configured to contain a reference table in which correspondence between gradual values of intensities of Raman excitation light and threshold values of Raman gain is set for each type of optical fibers, and obtain, from the reference table, the threshold value used for the judgment on abnormality of the transmission line.

5. An excitation light source device that outputs Raman excitation light amplifying signal light to a transmission line on which the signal light is transmitted, the excitation light source device comprising:

an excitation light source to generate the Raman excitation light;

a Raman gain measurer to measure Raman gain which is given to the signal light and is caused by the Raman excitation light generated by the excitation light source;

a light source controller to control, on a basis of a measurement result of the Raman gain measurer, an intensity of the Raman excitation light generated by the excitation light source and output intensity information indicating the controlled intensity; and a transmission line abnormality analyzer to detect abnormality in the transmission line on a basis of a comparison between a threshold value of intensity of Raman excitation light and an intensity of the Raman excitation light indicated by the intensity information, the threshold value being specified by a combination of a type of an optical fiber constituting the transmission line and the measurement result of the Raman gain measurer, wherein the transmission line abnormality analyzer is configured to judge that the transmission line is not in abnormal when the intensity of the Raman excitation light exceeds the threshold value, and the transmission line is in abnormal when the intensity of the Raman excitation light does not exceed the threshold value, wherein, in a state where the transmission line abnormality analyzer judges that the transmission line is not in abnormal, the light source controller controls the intensity of the Raman excitation light generated by the excitation light source to increase such that the Raman gain gradually increases to a set value, and wherein, in a state where the transmission line abnormality analyzer judges that the transmission line is in abnormal, the light source controller controls the excitation light source to stop or reduce generation of the Raman excitation light.

6. The excitation light source device according to claim 5, wherein the light source controller controls the excitation light source by an automatic gain control system based on the Raman gain measured by the Raman gain measurer.

7. The excitation light source device according to claim 5, wherein the transmission line abnormality analyzer is configured to contain a reference table in which correspondence between gradual values of intensities of Raman excitation light and threshold values of intensity of Raman excitation light is set for each type of optical fibers, and obtain, from the reference table, the threshold value used for the judgment on abnormality of the transmission line.

8. An optical transmission system comprising:

a transmission line on which signal light is transmitted; and an excitation light source device according to claim 1, that is disposed in a downstream side of the transmission line.

9. An optical transmission system comprising:

a transmission line on which signal light is transmitted; and an excitation light source device according to claim 3, that is disposed in a downstream side of the transmission line.

* * * * *